United States Patent
Guo et al.

(10) Patent No.: US 9,162,264 B2
(45) Date of Patent: Oct. 20, 2015

(54) SYSTEM AND METHOD FOR REMEDIATION OF ORGANIC CONTAMINATED SOIL

(75) Inventors: Shuhai Guo, Liaoning (CN); Tingting Li, Liaoning (CN); Wang Yanhua, Liaoning (CN); Liu Kunpeng, Liaoning (CN); Li Fengmei, Liaoning (CN); Li Gang, Liaoning (CN)

(73) Assignee: SHENYANG INSTITUTE OF APPLIED ECOLOGY, CHINESE ACADEMY OF SCIENCES, Shenyang, Liaoning (CN)

(*) Notice: Subject to any disclaimer, the term of this patent is extended or adjusted under 35 U.S.C. 154(b) by 1026 days.

(21) Appl. No.: 13/138,083

(22) PCT Filed: Jan. 4, 2009

(86) PCT No.: PCT/CN2009/070002
§ 371 (c)(1),
(2), (4) Date: Jun. 29, 2011

(87) PCT Pub. No.: WO2010/081291
PCT Pub. Date: Jul. 22, 2010

(65) Prior Publication Data
US 2011/0268507 A1    Nov. 3, 2011

(30) Foreign Application Priority Data
Dec. 30, 2008   (CN) .......................... 2008 1 0230381

(51) Int. Cl.
*B09C 1/08* (2006.01)
*G06F 1/26* (2006.01)

(52) U.S. Cl.
CPC .. *B09C 1/085* (2013.01); *G06F 1/26* (2013.01)

(58) Field of Classification Search
CPC ............ B09C 1/085; B09C 1/002; G06F 1/26
USPC ................. 405/128.1, 128.15, 128.45, 128.5, 405/128.7, 128.75; 700/90, 266, 271, 286, 700/297, 298, 306
See application file for complete search history.

(56) References Cited

U.S. PATENT DOCUMENTS

2007/0243022 A1* 10/2007 Pool ........................... 405/128.1

OTHER PUBLICATIONS

Luo, Q., Wang, H., Zhang, X., Fan, X., and Qian, Y. "In situ bioelectrokinetic remediation of phenol-contaminated soil by use of an electrode matrix and a rotational operation mode." Jan. 10, 2006. Chemsophere. Volume 64, Issue 3. pp. 415-422.*

* cited by examiner

*Primary Examiner* — Keith Hendricks
*Assistant Examiner* — Steven A. Friday
(74) *Attorney, Agent, or Firm* — Raymond Y. Chan; David and Raymond Patent Firm

(57) ABSTRACT

A system and a method for remediation of organic contaminated soil are provided, which comprises M*N electrodes to form an electrode matrix of symmetrical electric field structure. The field intensity is uniform in those points that are equidistant from each electrode in remediation area. The electrodes arrayed in mesh style in remediation area are carried out electrokinetic remediation. To exchange between positive polarity and negative polarity of the electrodes periodically is to make each electrode be a state of anode intermittently which has preferable remediation efficiency, by operation mode of reversing row/column electrode groups in manner of electrical scanning.

7 Claims, 11 Drawing Sheets

SYSTEM AND METHOD FOR REMEDIATION OF ORGANIC CONTAMINATED SOIL

BACKGROUND OF THE PRESENT INVENTION

1. Field of Invention

The present invention relates to a remediation technology for organic contaminated soil, and more particularly to a system and method of remediation of organic contaminated soil.

2. Description of Related Arts

Electrokinetic remediation of organic contaminated soil relates to technology of reinforced remediation which is developed in the 90's in the 20 century in which inert electrodes are inserted in the contaminated soil to create a DC electric field. The electrical interactions increase an activity level of microorganisms through which the remediation elements are improved and the rate of degradation of contaminants is increased. Compared to other remediation methods, electrokinetic remediation method is advantageous in providing high efficiency and high safety level.

Electrokinetic remediation of organic contaminated soil has two major limitations. First, imbalance pH value in the soil is caused by a process of acidification of anode. The reason is that after a DC electric field is applied, oxidation reduction reaction becomes feasible for water around the electrode and hence H+ and OH– ions are resulted and accumulated around the anode area and cathode area respectively, creating two zones for the acid and alkaline respectively. Accordingly, the soil is separated into two areas, the acid area and the alkaline area, which in turn decreases the activity level of the microorganisms in the soil and hence lowered the efficiency of removing contaminants. Second, the usable area percentage of the electrical field is relatively low, therefore the efficiency of removing contaminants is lowered. Different grid patterns or alignments are employed to solve this problem but the major problem of having a high percentage of non-usable area is not solved. On the other hand, the usable area in the field, the strength of electric field and the efficiency of degradation of contaminants are interrelated and are positively correlated.

In order to solve the problem of anode acidification, control methods such as bridging the two electrodes with electrolytes (Lee and Yang, 2000); adding cation exchange membrane (Li et al., 1998); adding buffer solution around the two zoned areas (Saichek et al. 2003); and applying electrodes to control a change of soil pH (Shen et al. 2007) are proposed. These methods is able to solve anode acidification at some level, but their applications are complicated, difficult to monitor, and costly in general. In order to increase the percentage of usable area for electrokinetic process, conventional method includes one-dimensional/two-dimensional electrode grid and two-ways operation process (Wang Wai et al. 2006). However, since the two adjacently positioned electrodes always have the same polarity under the two-ways operation process, dead corners are created and hence the percentage of usable area is still very low.

SUMMARY OF THE PRESENT INVENTION

In order to solve the problem, an object of the present invention is to provide a system and method of electrokinetic remediation for organic contaminated soil which is capable of solving the problem of dead corners while increasing utilization percentage of electric field.

Additional advantages and features of the invention will become apparent from the description which follows, and may be realized by means of the instrumentalities and combinations particular point out in the appended claims.

According to the present invention, the foregoing and other objects and advantages are attained by the followings:

A method of remediation which comprises the steps of: providing a remediation process in which symmetrical electric fields are employed, which means in a defined field, any point of equal distance from electrode has the same strength of electric field, and the element moving pattern in the electric field is the same;

wherein the remediation process comprises the steps of: arraying a plurality of electrodes in a two-dimensional manner such that a plurality of grids are defined through a plurality of rows and a plurality of columns of the electrodes aligned in the field, wherein the plurality of electrodes are first electrodes and second electrodes, wherein the first electrodes have a preset polarity at a particular time and the second electrodes have an opposite polarity with respect to the first electrodes at the particular time; and electrically controlling the plurality of electrodes in such a manner that the polarity of the first electrodes and the polarity of the second electrodes are switched periodically after a preset switching time period, thereby each of the electrodes is intermittently under an anode condition of which an efficiency of remediation is relatively higher; avoiding acidification of anode while having the anode condition to each of the electrodes for higher efficiency of remediation. Accordingly, the effective utilization area of electric field is increased and the remediation dead corners are eliminated.

The symmetrical electric field refers to in a remediation cycle, any point in the field of equal distance from electrode has the same strength of electric field, and the element moving pattern in the electric field is the same, wherein the polarity of the electrodes are controlled and switched through electrically scanning and processing the rows and the columns of the electrodes.

The plurality of electrodes form a matrix in which the plurality of electrodes are connected to terminals of a relay which is connected to a PLC through which the relay is controlled, thereby polarity switching for electrodes and pulsating current is achieved.

During the remediation process, one or more additive is added which serves as nutritional element of a decomposing organism or of a microorganism in the contaminated soil of the field such that the electrokinetic remediation process is enhanced and the removal efficiency of organic contaminants is increased.

The decomposing organism is selected based on the type of contaminated soil targeted for remediation. For example, for petroleum type contamination, composite solution or agent containing *Arthrobacter globiformis, Clavibacter xyli, Curtobacterium flaccumfaciens, Bacillus subtilis, Pseudomonas aeruginosa, Bacillus* sp. which are mixed at preset concentration is preferred.

The additive serving as nutritional element can be selected from one or more of inorganic nitrates (N) and inorganic phosphates (P) in which a ratio of N/P is 100:1.

According to a preferred embodiment of the present invention, the system of remediation of contaminated soil in a field includes:

a breaker connected to an external power source;

a power switch having an input terminal electrically connected to the breaker, and a output terminal arranged for providing 24V and 0V voltage;

a programmable logic control unit connected to the output terminal of the power switch and stores a control program through which the system of remediation is controlled; and a plurality of electrodes defining M×N matrix in the field, aligned and numbered in sequence in such a manner that a plurality of horizontal arrays of electrodes and a plurality of vertical arrays of electrodes aligned which are aligned and numbered in sequence are defined in the M×N matrix; and a control relay comprising a control relay coil unit having a positive electrode arranged for receiving a control signal from the programmable logic control unit for each of the electrodes of the matrix; and a power relay electrically connected with the control relay and the M×N matrix;

wherein each the control relay has an open end defining a first end at the open end and a second end opposite to the open end, wherein the power relay has a power relay coil unit in which a positive electrode of the power relay coil unit are connected to the horizontal array of electrodes, wherein the positive electrode of the power relay is connected to the first end of the open end of the control relay to which the horizontal array of electrodes are connected, wherein when the system consists of 10 control relays, namely control relay 1, 2, 3, 4, 5, 6, 7, 8, 9, 10 (KA1, KA2, KA3, KA4, KA5, KA6, KA7, KA8, KA9, KA10) respectively, the first end of the open end of the control relay of each of the control relay 1, 3, 5, 7, 9, 10 (KA1, KA3, KA5, KA7, KA9, KA10) are connected to a positive electrode of the power switch (GS), the first end of the open end of the control relay of each of the control relay 2, 4, 6, 8 (KA2, KA4, KA6, KA8) are connected to a negative electrode of the power switch (GS), wherein the second end which is opposite to the open end of the control relays 1 and 2 (KA1 and KA2) are connected to the power relay to which the electrodes of the horizontal arrays being numbered with an odd number are connected, wherein the second end which is opposite to the open end of the control relays 3 and 4 (KA3 and KA4) are connected to the power relay to which the electrodes of the horizontal arrays being numbered with an even number are connected, wherein the second end which is opposite to the open end of the control relays 5 and 6 (KA5 and KA6) are connected to the power relay to which the electrodes of the vertical arrays being numbered with an odd number are connected, wherein the second end which is opposite to the open end of the control relays 7 and 8 (KA7 and KA8) are connected to the power relay to which the electrodes of the vertical arrays being numbered with an even number are connected, wherein each the two electrodes which are adjacently positioned in a horizontal direction or in a vertical direction respectively are connected together through the first and the second ends of the two ends of the power relay;

wherein each the electrode has a diameter of 0.5 cm-5 cm and a length of 6 cm-150 cm, wherein two the power relays are arranged for one particular electrode, wherein the two power relays of the one particular electrode are electrically connected to the power switch which is a switching control for controlling the row and the column through connecting wires and the power relays of the electrode at a position adjacent to the one particular electrode in the horizontal and the vertical directions;

wherein a distance between two the electrodes which are adjacently positioned is 0.20 m-1.5 m;

wherein a strength of electric field of any point of equal distance from each the electrode is the same in the field.

The system further includes a control process which comprises the steps of:

(Step 1) presetting a plurality of parameters, if not, waiting for presetting the plurality of parameters, wherein the plurality of parameters includes a switching time period for the horizontal and the vertical arrays;

(Step 2) determining if a start button is pressed, if yes, indicating a status of automatically processing through a system status display and proceeding to step 3, if the start button is not pressed; if no, indicating a status of standby through the system status display and waiting for the start button being pressed;

(Step 3) determining if a stop button is pressed, if yes, indicating the status of standby and carrying out previous step 2; if no, proceeding next step 4;

(Step 4) resetting the switching time period to zero;

(Step 5) applying a positive voltage to each the electrodes which is positioned in the horizontal array and is numbered with an odd number, and applying a 0V to each the electrodes which is positioned in the horizontal array and is numbered with an even number;

(Step 6) determining if the switching time period is reached, if yes, proceeding next step 7, if no, carrying out steps 4 and 5;

(Step 7) resetting the switching time period to zero;

(Step 8) applying a positive voltage to each the electrodes which is positioned in the vertical array and is numbered with an odd number, and applying a 0V to each the electrodes which is positioned in the vertical array and is numbered with an even number;

(Step 9) determining if the switching time period is reached, if yes, proceeding next step 10; if no, carrying out steps 8 and 9;

(Step 10) resetting the switching time period to zero;

(Step 11) applying a 0V to each the electrodes which is positioned in the horizontal array and is numbered with an odd number, and applying a positive voltage to each the electrodes which is positioned in the horizontal array and is numbered with an even number;

(Step 12) determining if the switching time period is reached, if yes, proceeding next step 13; if no, carrying out steps 11 and 12;

(Step 13) resetting the switching time period to zero;

(Step 14) applying a 0V to each the electrodes which is positioned in the vertical array and is numbered with an odd number, and applying a positive voltage to each the electrodes which is positioned in the vertical array and is numbered with an even number; and (Step 15) determining if the switching time period is reached, if yes, proceeding to the step 4; if no, carrying out steps 13 and 14.

In accordance with another aspect of the invention, the control process may also comprises the steps of:

(Step 1) presetting a plurality of parameters; and waiting for presetting the plurality of parameters if the plurality of parameters are not set, wherein the plurality of parameters includes a switching time period for the horizontal and the vertical arrays, a pulse connecting time, and a pulse disconnecting time;

(Step 2) determining if a start button is pressed, if yes, indicating a status of automatically processing through a system status display and proceeding to step 3, if the start button is not pressed; if no, indicating a status of standby through the system status display and waiting for the start button being pressed;

(Step 3) determining if a stop button is pressed, if yes, indicating the status of standby and carrying out previous step 2; if no, proceeding next step 4;

(Step 4) resetting the switching time period to zero;

(Step 5) determining if the pulse connecting time period is reached, then applying a positive voltage to each the electrodes which is positioned in the horizontal array and is numbered with an odd number and applying a 0V to each the electrodes which is positioned in the horizontal array and is numbered with an even number if the pulse connecting time period is not reached, and then proceeding next step 6 if the pulse connecting time period is reached;

(Step 6) resetting the pulse connecting time period to zero;

(Step 7) determining if the pulse disconnecting time period is reached, then stopping to apply a voltage to each the electrodes which is positioned in the horizontal array and is numbered with an odd number or an even number if the pulse disconnecting time period is not reached, and then proceeding next step 8 if the pulse disconnecting time period is reached;

(Step 8) resetting the pulse connecting time period to zero;

(Step 9) determining if the switching time period is reached, if yes, proceeding next step 10, if no, returning to step 5;

(Step 10) resetting the switching time period to zero;

(Step 11) determining if the pulse connecting time period is reached, then applying a positive voltage to each the electrodes which is positioned in the vertical array and is numbered with an odd number and applying a 0V to each the electrodes which is positioned in the vertical array and is numbered with an even number if the pulse connecting time period is not reached, and then proceeding next step 12 if the pulse connecting time period is reached;

(Step 12) resetting the pulse disconnecting time period to zero;

(Step 13) determining if the pulse disconnecting time period is reached, then stopping to apply a voltage to each the electrodes which is positioned in the vertical array and is numbered with an odd number or an even number if the pulse disconnecting time period is not reached, and then proceeding next step 14 if the pulse disconnecting time period is reached;

(Step 14) resetting the pulse connecting time period to zero;

(Step 15) determining if the switching time period is reached, if yes, proceeding next step 16, if no, returning to step 11;

(Step 16) resetting the switching time period to zero;

(Step 17) determining if the pulse connecting time period is reached, then applying a 0V to each the electrodes which is positioned in the horizontal array and is numbered with an odd number and applying a positive voltage to each the electrodes which is positioned in the horizontal array and is numbered with an even number if the pulse connecting time period is not reached, and then proceeding next step 18 if the pulse connecting time period is reached;

(Step 18) resetting the pulse disconnecting time period to zero;

(Step 19) determining if the pulse disconnecting time period is reached, then stopping to apply a voltage to each the electrodes which is positioned in the horizontal array and is numbered with an odd number or an even number if the pulse disconnecting time period is not reached, and then proceeding next step 20 if the pulse disconnecting time period is reached;

(Step 20) resetting the pulse connecting time period to zero;

(Step 21) determining if the switching time period is reached, if yes, proceeding next step 22, if no, returning to step 17;

(Step 22) resetting the switching time period to zero;

(Step 23) determining if the pulse connecting time period is reached, then applying a 0V to each the electrodes which is positioned in the vertical array and is numbered with an odd number and applying a positive voltage to each the electrodes which is positioned in the vertical array and is numbered with an even number if the pulse connecting time period is not reached, and then proceeding next step 24 if the pulse connecting time period is reached;

(Step 24) resetting the pulse disconnecting time period to zero;

(Step 25) determining if the pulse disconnecting time period is reached, then stopping to apply a voltage to each the electrodes which is positioned in the vertical array and is numbered with an odd number or an even number if the pulse disconnecting time period is not reached, and then proceeding next step 26 if the pulse disconnecting time period is reached;

(Step 26) resetting the pulse connecting time period to zero; and (Step 27) determining if the switching time period is reached, if yes, proceeding to step 3, if no, returning to step 23.

The present invention make use of control process of electrodes and pulsating current to realize a truly symmetrical field in the remediation field, establishing a symmetrical field in view of space and physics. Because an efficiency of remediation is higher in an anode zone than that of a cathode zone, one electrode of intermittently under an anode condition according to the preferred embodiment of the present invention. The overall remediation efficiency of electric field is increased. The field is divided into a plurality of unit field and every single unit field is under the condition of symmetrical electric field. Therefore, maximum level of dead corner elimination is achieved, imbalance soil pH problem is solved, and the remediation efficiency of the whole system is increased.

The present invention has the following advantages:

In controlling and switching the polarity of each electrode through electrically scanning and processing the rows and the columns of the electrodes, symmetrical electric field is created, dead corners are eliminated, utilization percentage of electric field is increased.

Mass transfer between the contaminants and the microorganisms are enhanced while energy consumption is reduced through the pulsating current design.

Operation process is simplified through the automate control.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 8-2 illustrates flow diagram of a control process of the programmable logic control according to another exemplary mode of the above preferred embodiment of the present invention.

FIG. 8-3 is the continued portion for FIG. 8-2.

DETAILED DESCRIPTION OF THE PREFERRED EMBODIMENT

Figure 1A:
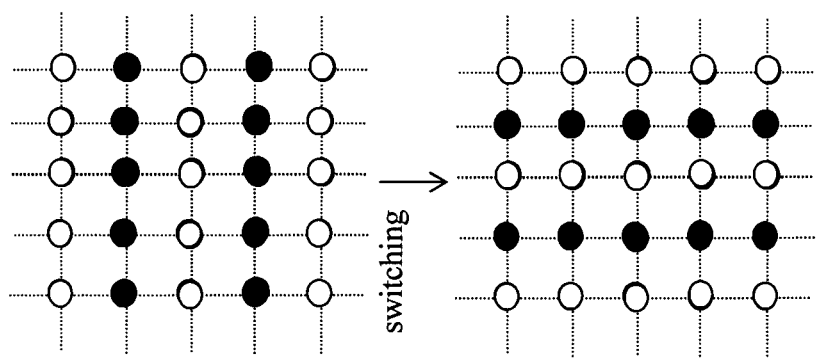
FIG. 1a is an illustration of alignment of electrodes in a symmetrical electric field according to a preferred embodiment of the present invention (solid circle refers to anode, hollow circle refers to cathode, 5×5 grid, vertical array pattern is: anode, cathode, anode, cathode, anode).

The preferred embodiments are further described in combination with the above drawings as follows:

Exemplary Embodiment 1

In this embodiment, a method of remediation of contaminated soil in a field, includes the steps of: providing a remediation process in which symmetrical electric fields are employed, wherein said remediation process comprises the steps of: arraying a plurality of electrodes in a two-dimensional manner such that a plurality of grids are defined through a plurality of rows and a plurality of columns of said electrodes aligned in the field, wherein said plurality of electrodes are first electrodes and second electrodes, wherein said first electrodes have a preset polarity at a particular time and said second electrodes have an opposite polarity with respect to said first electrodes at said particular time; and electrically controlling said plurality of electrodes in such a manner that said polarity of said first electrodes and said polarity of said second electrodes are switched periodically after a preset switching time period, wherein said polarity of said electrodes are controlled and switched through electrically scanning and processing said rows and said columns of said electrodes, thereby eliminating a dead corner of remediation of the field.

In this embodiment, a petroleum contaminated soil is prepared as follows: selecting brown earth soil as clean soil, removing visible dead debris, natural drying under room condition, filtering through 2 mm mesh sieve unit, selecting crude petroleum oil from Daqing oil field in China, preparing the petroleum contaminated soil containing 20 mg/g oil, natural drying and laying for 7 days.

A degrading agent containing a mixture of microbial agents is added to the contaminated soil for targeting the crude petroleum oil from Daqing oil field. The agent contains *Arthrobacter globiformis, Clavibacter xyli, Curtobacterium flaccumfaciens, Bacillus subtilis, Pseudomonas aeruginosa* and *Bacillus* sp. After mixing the microbial agents evenly, add a preset quantity of 0.01 ml/g into the contaminated soil.

A soil room is constructed by square organic glass unit, where length is 100 cm, width is 100 cm, and height is 100 cm. The system of the present invention includes a M×N matrix in which a plurality of electrodes are aligned in such a manner that a symmetrical electric field is defined. Any point of equal distance from each of the electrodes has the same strength of electric field. The electrodes are arrayed in a two-dimensional manner through row/column construction which are controlled and scanned in such a manner that the polarity of the first electrodes for the row and the polarity of the second electrodes for the column are switched periodically after a preset switching time period, thereby a truly symmetrical construction in view of space and strength of electric field is realized. Further details is provided as follows:

Referring to FIGS. 1a-1d and 9, the remediation system for use in a field according to the preferred embodiment of the present invention includes: the symmetrical electric field construction through a 5×5 grid defined through the electrodes construction such that any point of equal distance from each of the electrodes has the same strength of electric field, wherein the symmetrical electric field construction is scanned and controlled such that a polarity of electrode for each of the electrodes are controlled to switched in a row/column manner such that a truly symmetrical construction in view of space and strength of electric field is realized, wherein two power relays are provided for each electrode, each particular power relay is electrically connected to the power relay of the electrode adjacently positioned to the particular power relay in the horizontal and the vertical directions and is electrically connected to control circuit for controlling pulsating current, wherein the control process includes implementation of pulsating current and pulse control through controlling pulsating current to minimize energy use.

Figure 6:
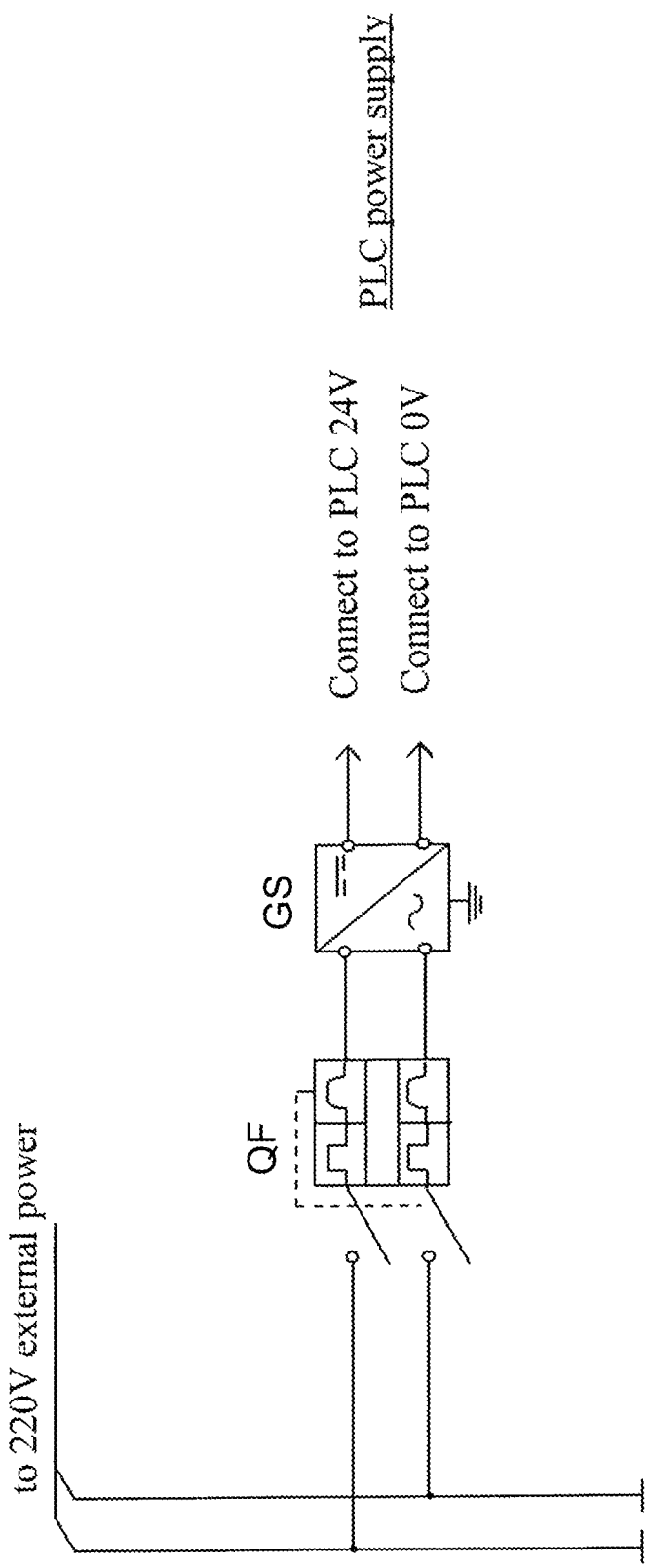
FIG. 6 illustrates a control circuit diagram (which includes power switch and breaker) according to the above preferred embodiment of the present invention.
Figure 7:
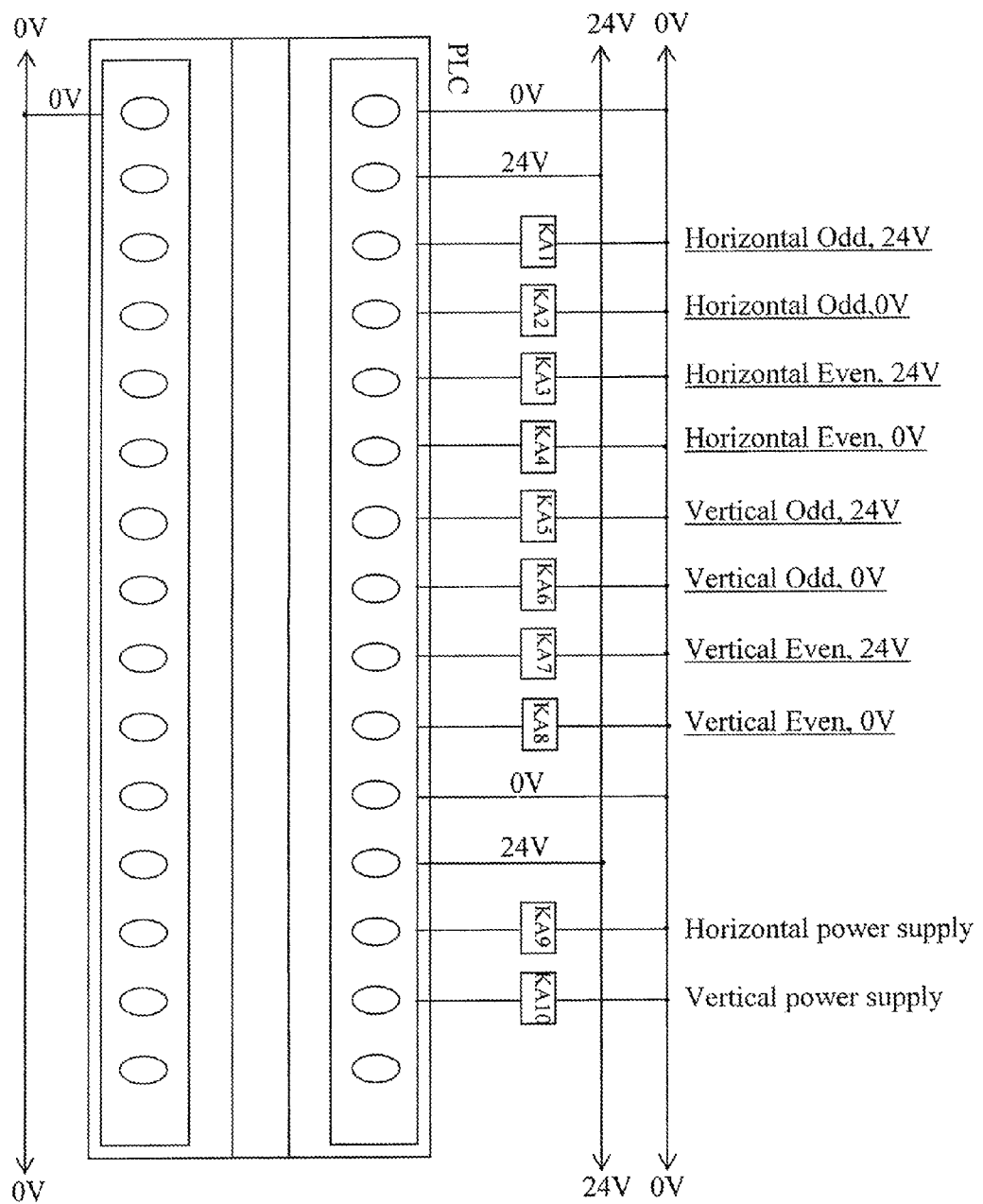
FIG. 7 illustrates a control circuit diagram (which includes programmable logic control) according to the above preferred embodiment of the present invention.

Referring to FIGS. 6 and 7 of the drawings, the remediation system includes:

a breaker (QF) connected to an external power source, wherein the breaker (QF) is preferably a bipolar 6A breaker which is capable of protecting circuit;

a power switch (GS) having an input terminal electrically connected to said breaker (QF) and a output terminal which provides 24V and 0V voltage, and electrically connecting to the programmable logic control unit (PLC) arranged for providing power supply to the programmable logic control unit (PLC);

a programmable logic control unit (PLC) electrically connected to the power switch (GS) and stored a control program through which said system of remediation is controlled, preferably, the S7-200 series of SIEMENS is selected for serving as the programmable logic control unit; and a plurality of relay units which includes control relay, wherein the control relay has a coil unit having a cathode connected to a cathode of the power switch GS and an anode receiving a control signal from the programmable logic control; and a power relay connecting to a plurality of electrodes through which a M×N matrix is defined and the control relay. The plurality of electrodes are aligned and numbered in sequence in such a manner that a plurality of horizontal arrays of electrodes and a plurality of vertical arrays of electrodes which are aligned and numbered in sequence are defined in the M×N matrix. Further details is described as follows:

Each control relay has an open end defining a first end at said open end and a second end opposite to said open end. For the control relay 1, 3, 5, 7, 9, 10, which are KA1, KA3, KA5, KA7, KA9, KA10, said first end of said open end of each said control are connected to a positive electrode of said power switch (GS). For control relay 2, 4, 6, 8, which are KA2, KA4, KA6, KA8, said first end of said open end of each said control are connected to a negative electrode of said power switch (GS). The second end, which is opposite to said open end, of said control relays 1 and 2, KA1 and KA2, are connected to the 25th electrode 25 to which said electrodes of said horizontal arrays being numbered with an odd number are connected. The second end, which is opposite to said open end, of said control relays 3 and 4, KA3 and KA4, are connected to the 6th electrode 6 to which said electrodes of said horizontal arrays being numbered with an even number are connected. The second end, which is opposite to said open end, of said control relays 5 and 6, KA5 and KA6, are connected to the 1st electrode 1 to which said electrodes of said vertical arrays being numbered with an odd number are connected. The second end, which is opposite to said open end, of said control relays 7 and 8, KA7 and KA8, are connected to the 22nd electrode 22 to which said electrodes of said vertical arrays being numbered with an even number are connected. For power relay 11~30, which are KA11-KA30, said first and second ends of each said control are connected to the two adjacently positioned electrodes of said horizontal array. For power relay 31~50, which are KA31-KA50, said first and second ends of each said control are connected to the two adjacently positioned electrodes of said vertical array. All cathodes of the control relay coil unis of the control relays are connected to the cathode of the power switch GS. The anodes of the coil units of the 1st~10th control relays KA1-KA10 receive the control signal from the programmable logic control PLC. The anodes of the coil units of the 11st~30th control relays KA11-KA30 connect to the second end of the 9th control relay KA9 to which the electrodes aligned in the horizontal direction or array are connected. The anodes of the coil units of the 31st~50th control relays KA31-KA50 connect to the second end of the 10th control relay KA10 to which the electrodes aligned in the vertical direction or array are connected.

In particular, the 1st control relay KA1 determines whether addition of 24V to electrodes positioned in the horizontal arrays with an odd number is required. The 2nd control relay KA2 determines whether addition of 0V to electrodes positioned in the horizontal arrays with an odd number is required. The 3rd control relay KA3 determines whether addition of 24V to the relay to which electrodes positioned in the horizontal arrays with an even number is connected is required. The 4th control relay KA4 determines whether addition of 0V to electrodes positioned in the horizontal arrays with an even number is required. The 5th control relay KA5 determines whether addition of 24V to electrodes positioned in the vertical arrays with an odd number is required. The 6th control relay KA6 determines whether addition of 0V to electrodes positioned in the vertical arrays with an odd number is required. The 7th control relay KA7 determines whether addition of 24V to the relay to which electrodes positioned in the vertical arrays with an even number is connected is required. The 8th control relay KA8 determines whether addition of 0V to electrodes positioned in the vertical arrays with an even number is required. The 9th control relay KA9 determines whether addition of voltage to electrodes positioned in the horizontal arrays is required through controlling the open/close condition of the first end of the 11th~30th power relay KA11-KA30. The 10th control relay KA10 determines whether addition of voltage to electrodes positioned in the vertical arrays is required through controlling the open/close condition of the first end of the 31th~50th power relay KA31-KA50.

Figures 1, 8:
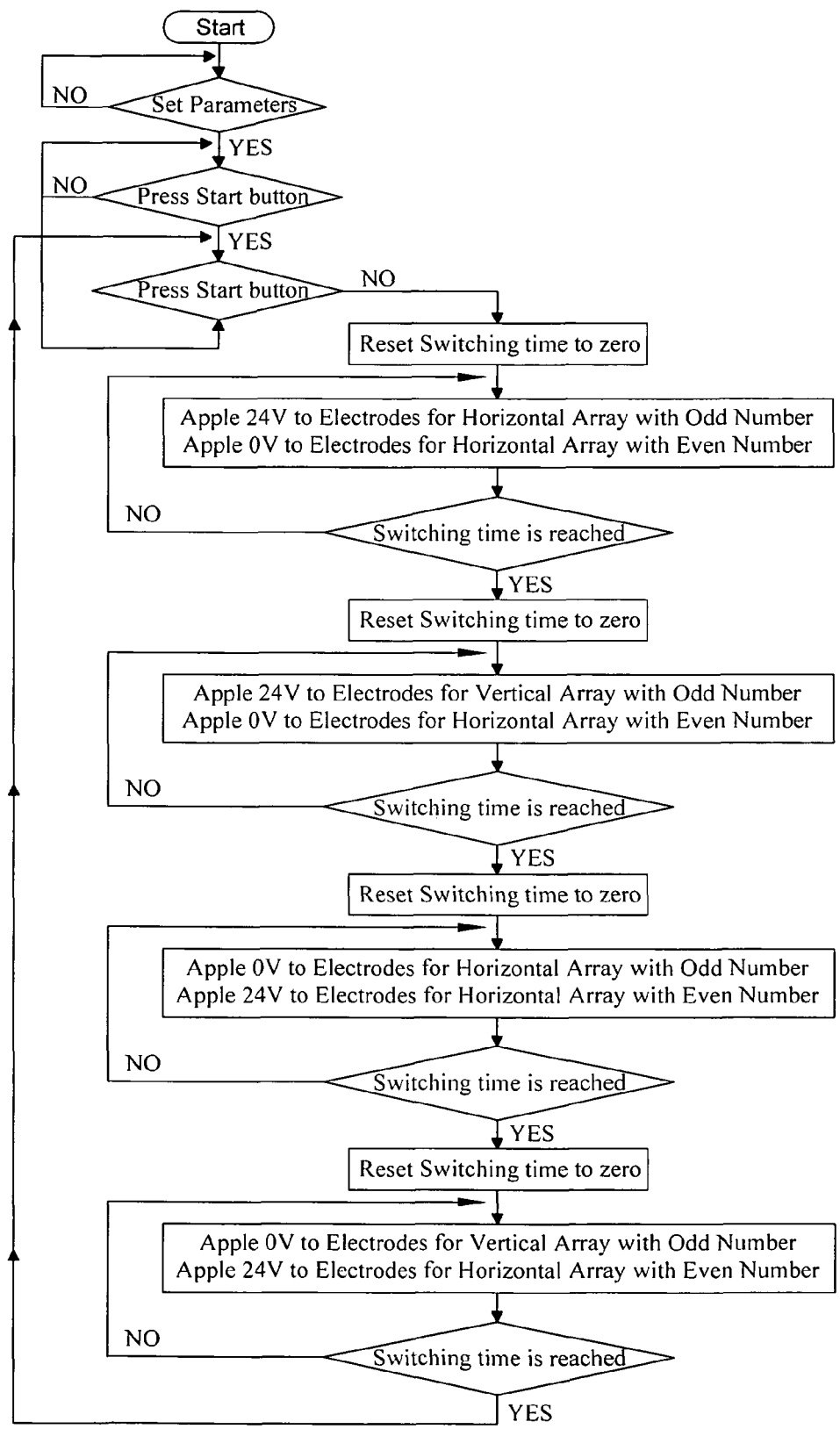
FIG. 8-1 illustrates flow diagram of a control process of the programmable logic control according to a first exemplary mode of the above preferred embodiment of the present invention.
Figures 2, 8:
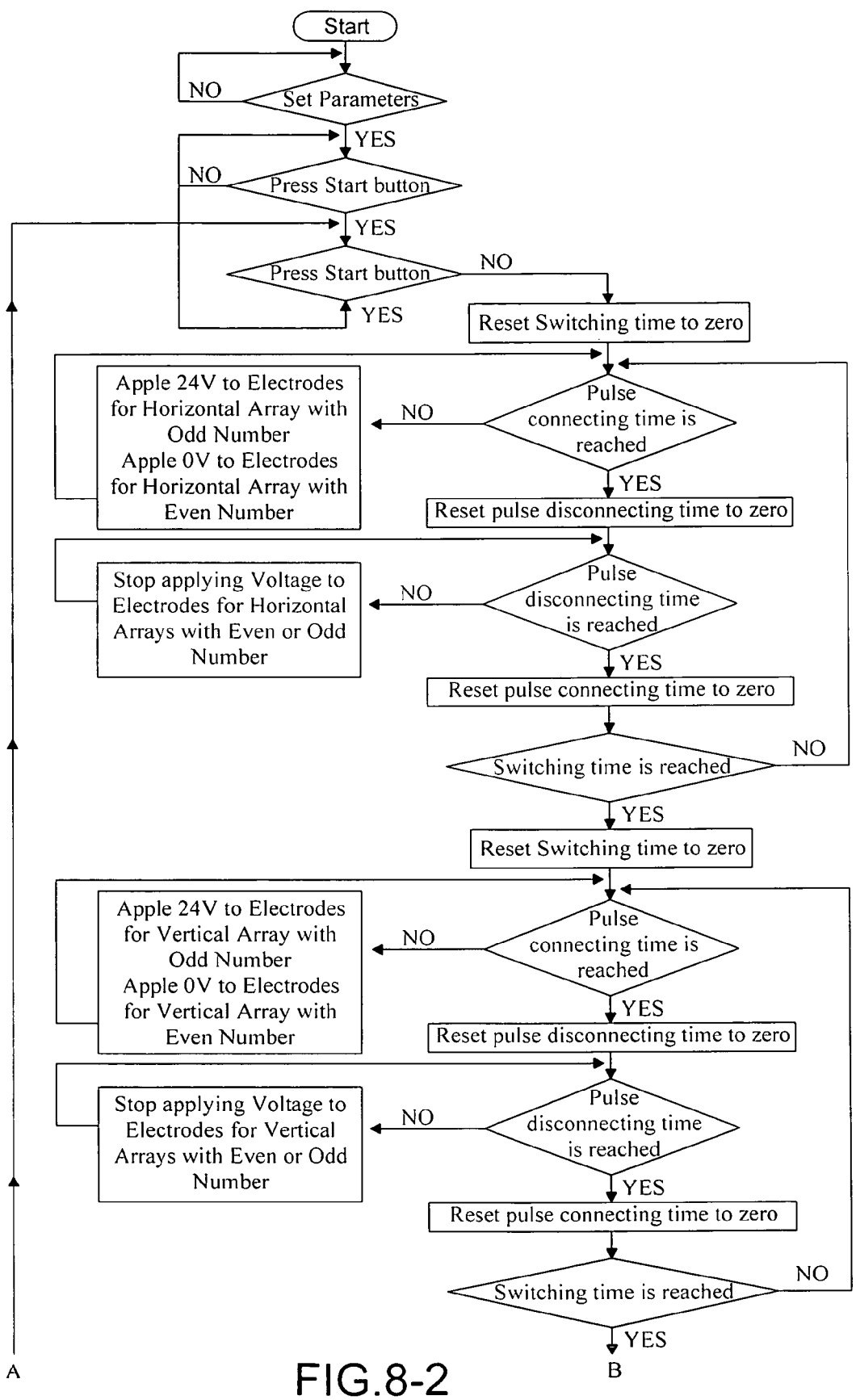
Figures 3, 8:
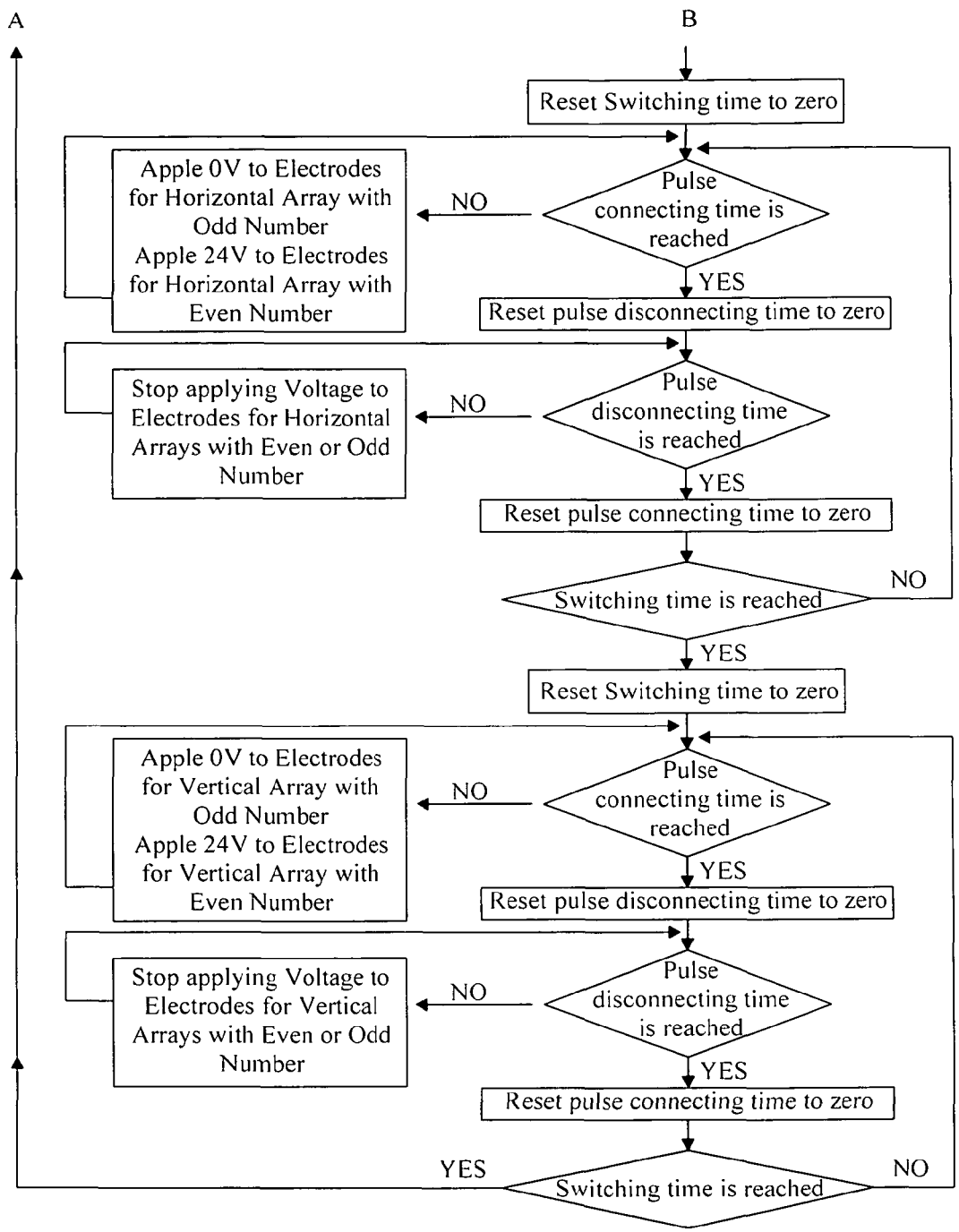

Referring to FIG. 8-1, the operation is carried out through a control process which is stored in the programmable logic control PLC, comprising the steps of:

(Step 1) presetting a plurality of parameters, if not, waiting for presetting the plurality of parameters, wherein the plurality of parameters includes a switching time period for the horizontal and the vertical arrays;

(Step 2) determining if a start button is pressed, if yes, indicating a status of automatically processing through a system status display and proceeding to step 3, if the start button is not pressed; if no, indicating a status of standby through the system status display and waiting for the start button being pressed;

(Step 3) determining if a stop button is pressed, if yes, indicating the status of standby and carrying out previous step 2; if no, proceeding next step 4;

(Step 4) resetting the switching time period to zero;

(Step 5) applying 24V to each the electrodes which is positioned in the horizontal array and is numbered with an odd number, and applying a 0V to each the electrodes which is positioned in the horizontal array and is numbered with an even number;

(Step 6) determining if the switching time period is reached (which is 1 minute in this example), if yes, proceeding next step 7, if no, carrying out steps 4 and 5;

(Step 7) resetting the switching time period to zero;

(Step 8) applying 24V to each the electrodes which is positioned in the vertical array and is numbered with an odd number, and applying 0V to each the electrodes which is positioned in the vertical array and is numbered with an even number;

(Step 9) determining if the switching time period (which is 1 minute in this example) is reached, if yes, proceeding next step 10; if no, carrying out steps 8 and 9;

(Step 10) resetting the switching time period to zero;

(Step 11) applying 0V to each the electrodes which is positioned in the horizontal array and is numbered with an odd number, and applying 24V to each the electrodes which is positioned in the horizontal array and is numbered with an even number;

(Step 12) determining if the switching time period (which is 1 minute in this example) is reached, if yes, proceeding next step 13; if no, carrying out steps 11 and 12;

(Step 13) resetting the switching time period to zero;

(Step 14) applying 0V to each the electrodes which is positioned in the vertical array and is numbered with an odd number, and applying 24V to each the electrodes which is positioned in the vertical array and is numbered with an even number; and (Step 15) determining if the switching time period (which is 1 minute in this example) is reached, if yes, proceeding to the step 4; if no, carrying out steps 13 and 14.

Figure 9:
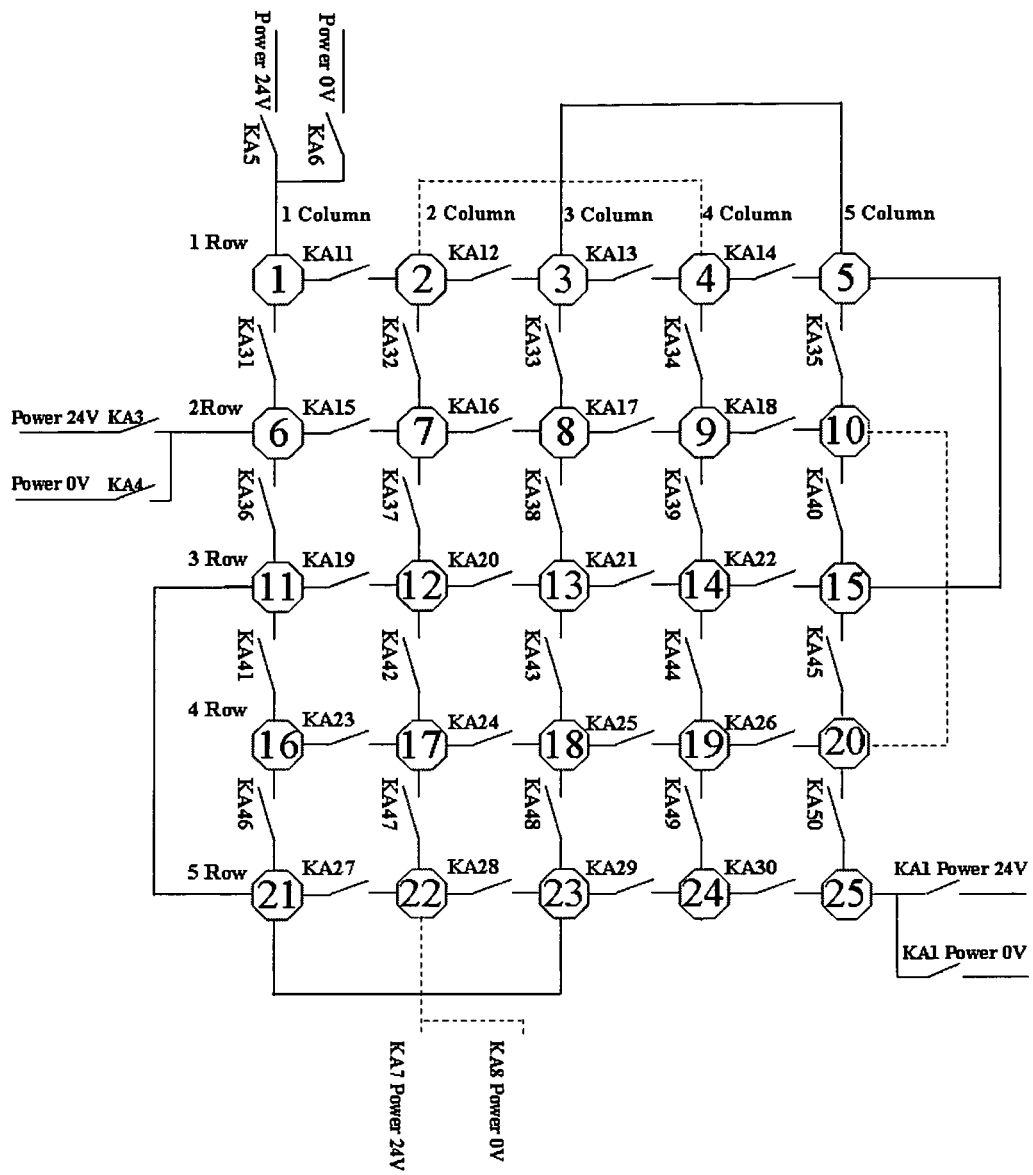
FIG. 9 is an illustration of element connection for the alignment of electrodes in a symmetrical electric field according to the above preferred embodiment of the present invention.

Referring to FIG. 9, the 31th~50th power relay KA31-KA50 are closed. The 5th control relay KA5 and the 8th control relay 8 are closed. According, 24V is added to electrodes positioned in the vertical arrays with an odd number, and 0V is added to electrodes positioned in the vertical arrays with an even number (as shown in FIG. 1*a*).

The 11th~30th power relay KA11-KA30 are closed. The 2nd control relay KA2 and the 3rd control relay 3 are closed.

Figure 1B:
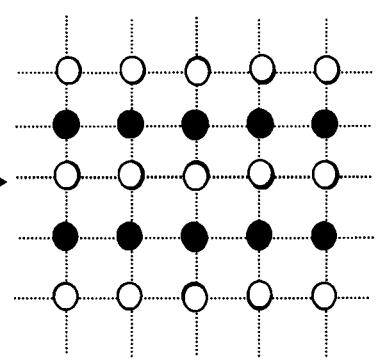
FIG. 1b is an illustration of alignment of electrodes in a symmetrical electric field according to the above preferred embodiment of the present invention (solid circle refers to anode, hollow circle refers to cathode, 5×5 grid, horizontal array pattern is: cathode, anode, cathode, anode, cathode).

According, 0V is added to electrodes positioned in the horizontal arrays with an odd number, and 24V is added to electrodes positioned in the horizontal arrays with an even number (as shown in FIG. 1b).

Figure 1C:
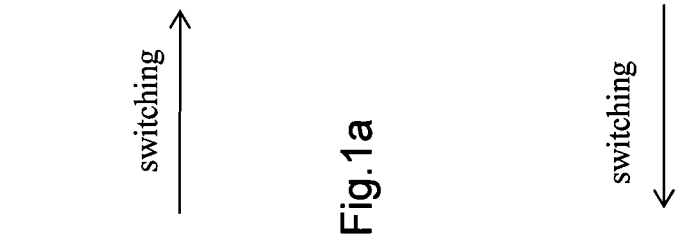
FIG. 1c is an illustration of alignment of electrodes in a symmetrical electric field according to the above preferred embodiment of the present invention (solid circle refers to anode, hollow circle refers to cathode, 5×5 grid, horizontal array pattern is: anode, cathode, anode, cathode, anode).
Figure 1D:
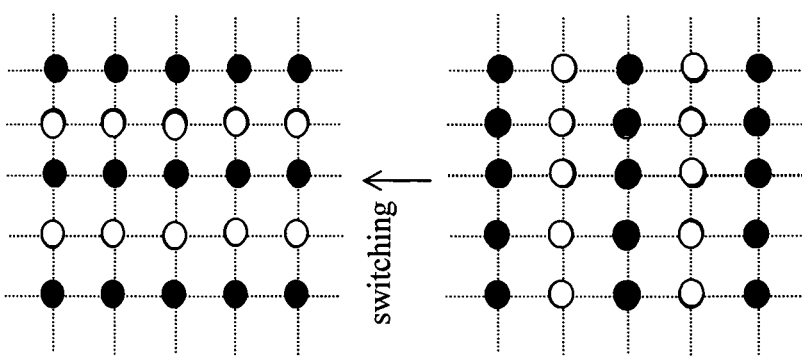
FIG. 1d is an illustration of alignment of electrodes in a symmetrical electric field according to the above preferred embodiment of the present invention (solid circle refers to anode, hollow circle refers to cathode, 5×5 grid, vertical array pattern is: cathode, anode, cathode, anode, cathode).

The 31th~50th power relay KA31-KA50 are closed. The 6th control relay KA6 and the 7th control relay 7 are closed. According, 0V is added to electrodes positioned in the vertical arrays with an odd number, and 24V is added to electrodes positioned in the vertical arrays with an even number (as shown in FIG. 1d).

The 11th~30th power relay KA11-KA30 are closed. The 1st control relay KA1 and the 4th control relay 4 are closed. According, 24V is added to electrodes positioned in the horizontal arrays with an odd number, and 0V is added to electrodes positioned in the horizontal arrays with an even number (as shown in FIG. 1c)

The electrodes are inert graphite electrodes which has an electrode diameter of 0.5 cm-5 cm and a length of 6 cm-150 cm (in this exemplary embodiment, the electrode diameter is 0.5 cm, the length is 6 cm). For each two electrodes in the field, the distance between two electrodes in the horizontal direction and in the vertical direction are the same, which is 0.2m. Two power relays are employed for each one electrode. One particular power relay is connected to another power relay which is adjacently positioned in the horizontal and in the vertical directions through connecting wires, and is connected to a power supply for which the switching of row/column switching process is controlled. The electrokinetic control involves connecting electrodes of the matrix to the positive and negative terminals of the DC power supply in such a manner that a truly symmetrical electric field in view of space and strength during operation is formed. The polarity of electrode is changed for every one minute. An electric field gradient for the external DC and the two terminals of the electrodes is of 1 V/cm. Soil temperature is recorded through temperature recording meter which is then input into a computer for real-time monitoring and data analysis. Soil humidity constant is 20%. Sampling points are sampling distance of 0 cm, 4 cm, 8 cm, 12 cm, 16 cm, 20 cm from the anode. The sample is collected for every 20 days. The processing time is 100 days. The control is the one without applying any electric field. The monitoring indexes are soil pH, soil temperature, organic element variation and rate of removal of petroleum.

Figure 2:
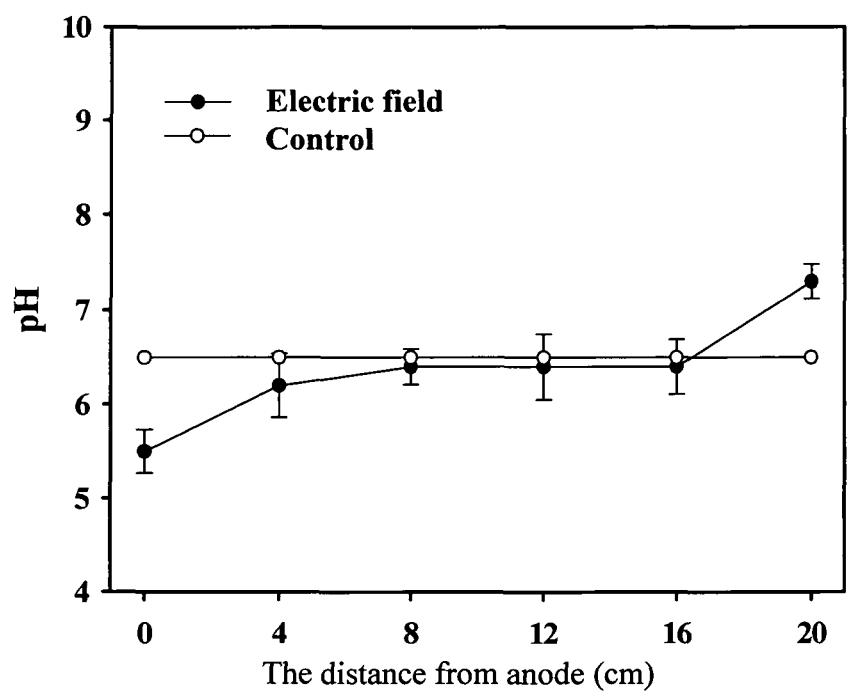
FIG. 2 illustrates a curve of soil pH change in relation to distance during the remediation process according to the above preferred embodiment of the present invention.
Figure 4:
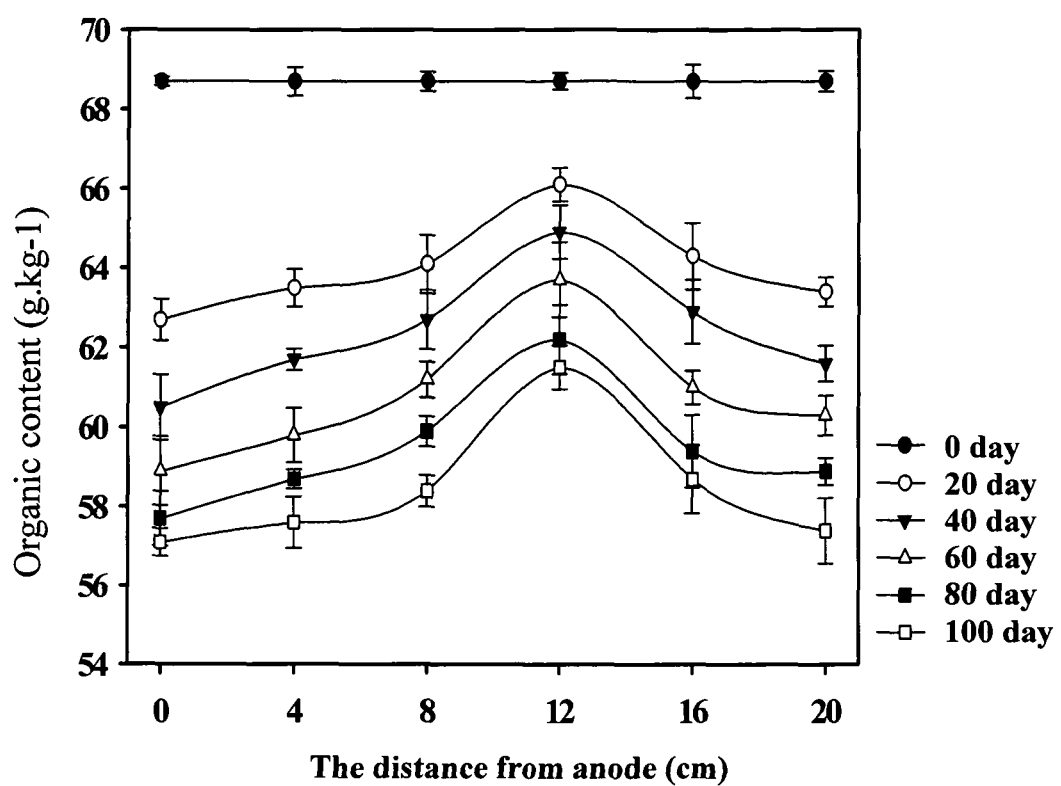
FIG. 4 illustrates a curve of soil organic element variation in relation to distance during the remediation process according to the above preferred embodiment of the present invention.
Figure 5:
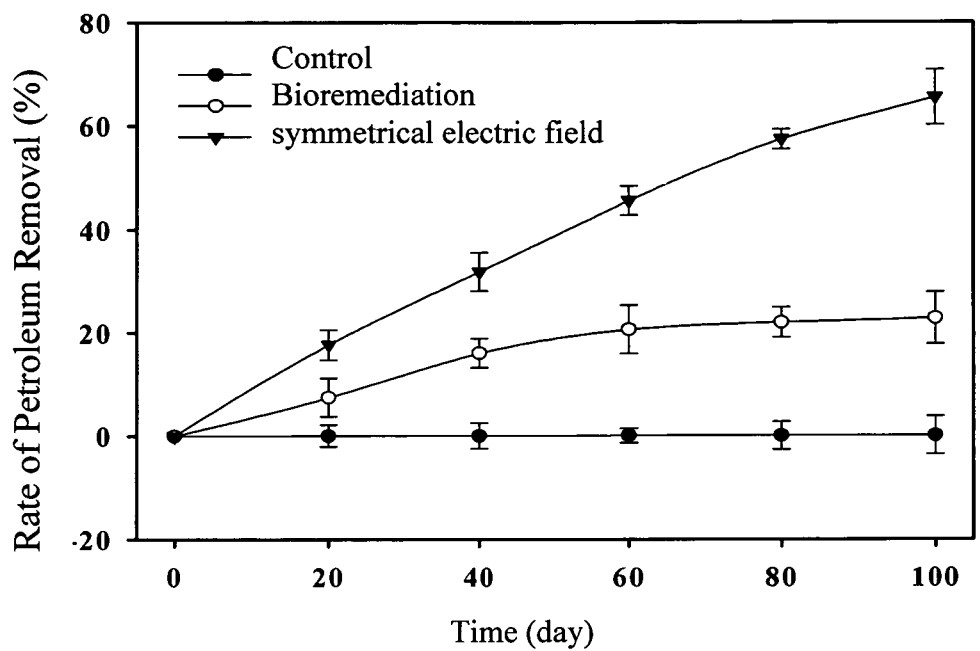
FIG. 5 illustrates a curve of contaminant removal rate over time during the remediation process according to the above preferred embodiment of the present invention.

Through monitoring the polarity of electrodes, the problem of acidification during the electrokinetic remediation process is solved satisfactorily and the soil condition is stable, which is shown in the results in FIG. 2. External electric field causes a portion of electricity convert to heat for joule heating which increases soil temperature, effectively preventing affecting soil condition by the external environment, which is shown in the results in FIG. 3. Through monitoring the polarity of electrodes, the electrodes are intermittently set as anode which is more effective, thereby increasing utilization percentage of the electrodes and hence increasing efficiency for organic carbon consumption, which is shown in the results in FIG. 4. Through the matrix design, a truly symmetrical electric field in relation to space and electric field strength is built, thereby increasing effective area in the field, elevating activity level of microorganisms, while increasing degradation process, of organic contaminants, which is shown in the results in FIG. 5.

Table 1 is the result showing variation of petroleum content in soil before and after electrokinetic remediation process.

TABLE 1

Variation of petroleum before and after electrokinetic processing

| Group | Processing factor | Petroleum content before processing | Petroleum content after processing | Processing time (Day) |
|---|---|---|---|---|
| Control | None | 2% | 1.9% | 100 |
| Group 1 | Microbial | 2% | 1.5% | 100 |
| Group 2 | Electrokinetic and Microbial | 2% | 0.7% | 100 |

Exemplary Embodiment 2

The different conditions as compared to exemplary embodiment 1 are as follows:

A soil room is constructed by square organic glass unit, where length is 200 cm, width is 200 cm, and height is 200 cm. The symmetrical electric field construction is a 6×6 grid construction. The electrodes are stainless steel electrodes which has an electrode diameter of 1cm and a length of 15 cm. The distance between two electrodes is 0.4m.

Additives of nutritional solution, which contains ammonium nitrate ($NH_4NO_3$) and potassium hydrophosphate ($K_2HPO_4$) for growth of microorganisms is sprayed onto the soil for increasing the metabolic rate of the microorganisms. The remediation effect is increased by 15% as compared to the exemplary embodiment 1.

Detailed results are shown in Table 2.

Table 2 is the results showing variation of petroleum content in soil before and after electrokinetic remediation process.

| Group | Processing factor | Petroleum content before processing | Petroleum content after processing | Processing time (Day) |
|---|---|---|---|---|
| Control | None | 2% | 1.9% | 100 |
| Group 1 | Microbial | 2% | 1.5% | 100 |
| Group 2 | Electrokinetic, Microbial, nutritional solution | 2% | 0.4% | 100 |

Exemplary Embodiment 3

The different conditions as compared to exemplary embodiment 1 are as follows:

The petroleum contaminated soil is prepared as follows: selecting clean soil, selecting crude petroleum oil from Daqing oil field in China, and preparing the petroleum contaminated soil containing 20 mg/g oil, natural drying and laying for 7 days.

During the switching process of polarity of electrodes, pulsating current is employed (through connecting and disconnecting to power source). The power supply is connected continuously for 1 minute and disconnected for 20 minutes. The switching time period is 5 minutes. The steps for providing pulsating current are repeated during the process. The electrodes are stainless steel inert electrodes. The processing time is 100 days. The control group is the one without application of electric field.

In the contaminated soil after processing for 100 days, soil pH is within the neutral range and does not show any obvious change. Soil temperature is higher than room temperature. The effect of external factors to the soil is effectively lowered. Details results are shown in Table 3.

Table 3 is the result showing variation of petroleum content in soil before and after electrokinetic remediation process.

TABLE 3

Variation of petroleum before and after electrokinetic processing

| Group | Processing factor | Petroleum content before processing | Petroleum content after processing | Processing time (Day) |
|---|---|---|---|---|
| Control | None | 2% | 1.9% | 100 |
| Group 1 | Microbial | 2% | 1.5% | 100 |
| Group 2 | Electrokinetic, Microbial, Pulsating current | 2% | 0.9% | 100 |

The application of pulsating current effectively decreases energy consumption of 40% continuously while the rate of degradation is decreased by 10%. The overall energy consumption is low while the remediation efficiency is high, serving energy saving purpose.

Figure 3:
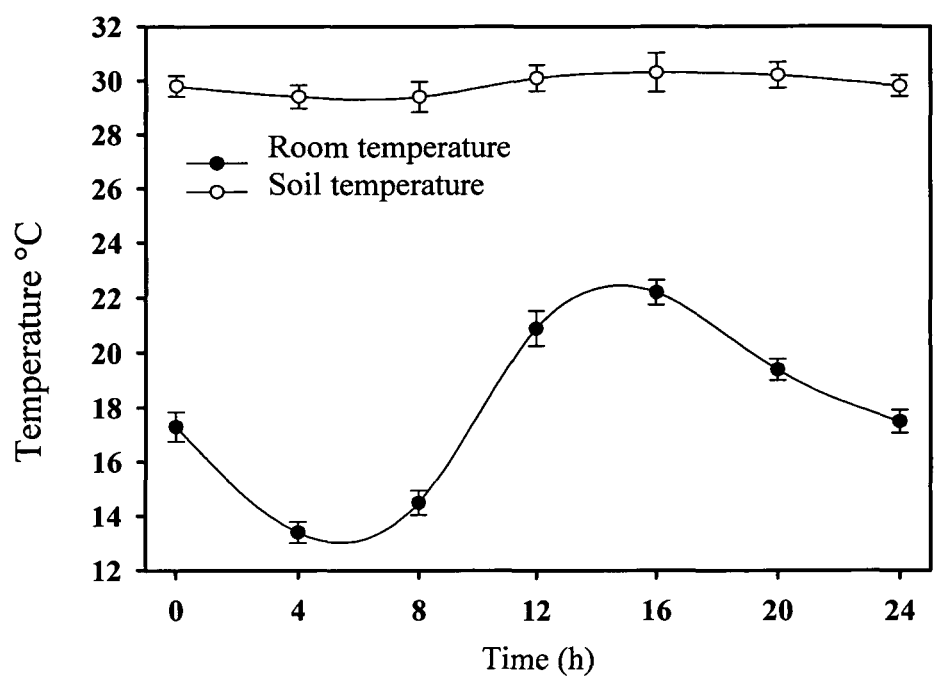
FIG. 3 illustrates a curve of soil temperature change over time during the remediation process according to the above preferred embodiment of the present invention.

Referring to FIGS. 8-2, 8-3, the process is implemented through the programmable logic control, comprising the steps of:

(Step 1) presetting a plurality of parameters; and waiting for presetting the plurality of parameters if the plurality of parameters are not set, wherein the plurality of parameters includes a switching time period for the horizontal and the vertical arrays, a pulse connecting time, and a pulse disconnecting time;

(Step 2) determining if a start button is pressed after the parameters are set, if yes, indicating a status of automatically processing through a system status display and proceeding to step 3; if the start button is not pressed, indicating a status of standby through the system status display and waiting for the start button being pressed;

(Step 3) determining if a stop button is pressed, if yes, indicating the status of standby and carrying out previous step 2; if no, proceeding next step 4;

(Step 4) resetting the switching time period to zero;

(Step 5) determining if the pulse connecting time period (which is 1 minute in this example) is reached, then applying 24V to each the electrodes which is positioned in the horizontal array and is numbered with an odd number and applying 0V to each the electrodes which is positioned in the horizontal array and is numbered with an even number if the pulse connecting time period is not reached, and then proceeding next step 6 if the pulse connecting time period is reached;

(Step 6) resetting the pulse connecting time period to zero;

(Step 7) determining if the pulse disconnecting time period (which is 20 seconds in this example) is reached, then stopping to apply voltage to each the electrodes which is positioned in the horizontal array and is numbered with an odd number or an even number if the pulse disconnecting time period is not reached, and then proceeding next step 8 if the pulse disconnecting time period is reached;

(Step 8) resetting the pulse connecting time period to zero;

(Step 9) determining if the switching time period (which is 5 minutes in this example) is reached, if yes, proceeding next step 10, if no, returning to carrying out steps 5, 6, 7 and 8;

(Step 10) resetting the switching time period to zero;

(Step 11) determining if the pulse connecting time period (which is 1 minute in this example) is reached, then applying 24V to each the electrodes which is positioned in the vertical array and is numbered with an odd number and applying a 0V to each the electrodes which is positioned in the vertical array and is numbered with an even number if the pulse connecting time period is not reached, and then proceeding next step 12 if the pulse connecting time period is reached;

(Step 12) resetting the pulse disconnecting time period to zero;

(Step 13) determining if the pulse disconnecting time period (which is 20 seconds in this example) is reached, then stopping to apply a voltage to each the electrodes which is positioned in the vertical array and is numbered with an odd number or an even number if the pulse disconnecting time period is not reached, and then proceeding next step 14 if the pulse disconnecting time period is reached;

(Step 14) resetting the pulse connecting time period to zero;

(Step 15) determining if the switching time period (which is 5 minutes in this example) is reached, if yes, proceeding next step 16, if no, returning to carrying out steps 11, 12, 13 and 14;

(Step 16) resetting the switching time period to zero;

(Step 17) determining if the pulse connecting time period (which is 1 minute in this example) is reached, then applying a 0V to each the electrodes which is positioned in the horizontal array and is numbered with an odd number and applying 24V to each the electrodes which is positioned in the horizontal array and is numbered with an even number if the pulse connecting time period is not reached, and then proceeding next step 18 if the pulse connecting time period is reached;

(Step 18) resetting the pulse disconnecting time period to zero;

(Step 19) determining if the pulse disconnecting time period (which is 20 seconds in this example) is reached, then stopping to apply a voltage to each the electrodes which is positioned in the horizontal array and is numbered with an odd number or an even number if the pulse disconnecting time period is not reached, and then proceeding next step 20 if the pulse disconnecting time period is reached;

(Step 20) resetting the pulse connecting time period to zero;

(Step 21) determining if the switching time period (which is 5 minutes in this example) is reached, if yes, proceeding next step 22, if no, returning to carrying out steps 17, 18, 19 and 20;

(Step 22) resetting the switching time period to zero;

(Step 23) determining if the pulse connecting time period (which is 1 minute in this example) is reached, then applying a 0V to each the electrodes which is positioned in the vertical array and is numbered with an odd number and applying 24V to each the electrodes which is positioned in the vertical array and is numbered with an even number if the pulse connecting time period is not reached, and then proceeding next step 24 if the pulse connecting time period is reached;

(Step 24) resetting the pulse disconnecting time period to zero;

(Step 25) determining if the pulse disconnecting time period (which is 20 seconds in this example) is reached, then stopping to apply a voltage to each the electrodes which is positioned in the vertical array and is numbered with an odd number or an even number if the pulse disconnecting time period is not reached, and then proceeding next step 26 if the pulse disconnecting time period is reached;

(Step 26) resetting the pulse connecting time period to zero; and (Step 27) determining if the switching time period (which is 5 minutes in this example) is reached, if yes, proceeding to step 3, if no, returning to carrying out steps 23, 24, 25 and 26.

Exemplary Embodiment 4

The different conditions as compared to exemplary embodiment 1 are as follows:

The petroleum contaminated soil is collected from Liaohe oil field in Panjin, China. The average oil content is 50 mg/g. The soil is arranged to form a rectangular block having a length of 13.5m, a width of 13.5m and a height of 2m. The symmetrical electric field construction is a 9×9 grid construction. The electrodes are stainless steel electrodes which has an electrode diameter of 5 cm and a length of 150 cm. The distance between two electrodes is 1.5m. A symmetrical electric field in relation to space is formed. No external microorganism is added but microorganisms in the soil itself are used. Sampling points are sampling distance of 5 cm, 15 cm, 25 cm, 35 cm, 45 cm from the anode. The sample is collected for every 20 days. The processing time is 100 days. The control is the one without applying any electric field. Detailed results are shown in Table 4.

Table 4 is the result showing variation of petroleum content in soil before and after electrokinetic remediation process.

TABLE 4

Variation of petroleum before and after electrokinetic processing

| Group | Processing factor | Petroleum content before processing | Petroleum content after processing | Processing time (Day) |
|---|---|---|---|---|
| Control | None | 5% | 4.9% | 100 |
| Group 1 | Electrokinetic | 5% | 1.7% | 100 |

The present invention employs effective control through pulsating current and electrically scanning in a row/column manner for switching polarity of electrodes such that a truly symmetrical electric field construction in view of space and strength of electric field is achieved, thereby solving the problem of anode acidification, lowering energy consumption while eliminating dead corners problem, and increasing the remediation efficiency of processing contaminated soil.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A system of remediation of contaminated soil in a field, comprising:
a breaker (QF) connected to an external power source;
a power switch (GS) having an input terminal electrically connected to said breaker (QF), and a output terminal;
a programmable logic control unit (PLC) connected to said output terminal of said power switch (GS) and stores a control program through which said system of remediation is controlled;
a plurality of electrodes defining M×N matrix in the field, aligned and numbered in sequence in such a manner that a plurality of horizontal arrays of electrodes and a plurality of vertical arrays of electrodes aligned which are aligned and numbered in sequence are defined in said M×N matrix;
a plurality of control relays each comprising a control relay coil unit having a positive electrode arranged for receiving a control signal from said programmable logic control unit for each of said electrodes of said matrix; and
a power relay electrically connected with said control relay and said M×N matrix.

2. A system of remediation of contaminated soil, as recited in claim 1, wherein each said control relay has an open end defining a first end at said open end and a second end opposite to said open end, wherein said power relay has a power relay coil unit in which a positive electrode of said power relay coil unit are connected to said horizontal array of electrodes, wherein said positive electrode of said power relay is connected to said first end of said open end of said control relay to which said horizontal array of electrodes are connected, wherein when said system consists of 10 control relays, which are control relay 1, 2, 3, 4, 5, 6, 7, 8, 9, 10 (KA1, KA2, KA3, KA4, KA5, KA6, KA7, KA8, KA9, KA10) respectively, said first end of said open end of said control relay of each of said control relay 1, 3, 5, 7, 9, 10 (KA1, KA3, KA5, KA7, KA9, KA10) are connected to a positive electrode of said power switch (GS), said first end of said open end of said control relay of each of said control relay 2, 4, 6, 8 (KA2, KA4, KA6, KA8) are connected to a negative electrode of said power switch (GS), wherein said second end which is opposite to said open end of said control relays 1 and 2 (KA1 and KA2) are connected to said power relay to which said electrodes of said horizontal arrays being numbered with an odd number are connected, wherein said second end which is opposite to said open end of said control relays 3 and 4 (KA3 and KA4) are connected to said power relay to which said electrodes of said horizontal arrays being numbered with an even number are connected, wherein said second end which is opposite to said open end of said control relays 5 and 6 (KA5 and KA6) are connected to said power relay to which said electrodes of said vertical arrays being numbered with an odd number are connected, wherein said second end which is opposite to said open end of said control relays 7 and 8 (KA7 and KA8) are connected to said power relay to which said electrodes of said vertical arrays being numbered with an even number are connected, wherein each said two electrodes which are adjacently positioned in a horizontal direction or in a vertical direction respectively are connected together through said first and said second ends of said two ends of said power relay.

3. A system of remediation of contaminated soil, as recited in claim 1, wherein each said electrode has a diameter of 0.5 cm-5 cm and a length of 6 cm-150 cm, wherein two said power relays are arranged for one particular electrode, wherein said two power relays of said one particular electrode are electrically connected to said power switch (GS) which is a switching control for controlling said row and said column through connecting wires and said power relays of said electrode at a position adjacent to said one particular electrode in said horizontal and said vertical directions.

4. A system of remediation of contaminated soil, as recited in claim 1, wherein a distance between two said electrodes which are adjacently positioned is 0.20 m-1.5 m.

5. A system of remediation of contaminated soil, as recited in claim 1, wherein a strength of electric field of every two electrodes with equal distance is the same in the field.

6. A system of remediation of contaminated soil, as recited in claim 1, which is configured to perform a control process which comprises the steps of:
(Step 1) presetting a plurality of parameters, if not, waiting for presetting said plurality of parameters, wherein said plurality of parameters includes a switching time period for said horizontal and said vertical arrays;

(Step 2) determining if a start button is pressed, if yes, indicating a status of automatically processing through a system status display and proceeding to step 3, if the start button is not pressed; if no, indicating a status of standby through the system status display and waiting for the start button being pressed;

(Step 3) determining if a stop button is pressed, if yes, indicating the status of standby and carrying out previous step 2; if no, proceeding next step 4;

(Step 4) resetting said switching time period to zero;

(Step 5) applying a positive voltage to each said electrodes which is positioned in said horizontal array and is numbered with an odd number, and applying a negative voltage to each said electrodes which is positioned in said horizontal array and is numbered with an even number;

(Step 6) determining if said switching time period is reached, if yes, proceeding next step 7, if no, carrying out steps 4 and 5;

(Step 7) resetting said switching time period to zero;

(Step 8) applying a positive voltage to each said electrodes which is positioned in said vertical array and is numbered with an odd number, and applying a negative voltage to each said electrodes which is positioned in said vertical array and is numbered with an even number;

(Step 9) determining if said switching time period is reached, if yes, proceeding next step 10; if no, carrying out steps 8 and 9;

(Step 10) resetting said switching time period to zero;

(Step 11) applying a negative voltage to each said electrodes which is positioned in said horizontal array and is numbered with an odd number, and applying a positive voltage to each said electrodes which is positioned in said horizontal array and is numbered with an even number;

(Step 12) determining if said switching time period is reached, if yes, proceeding next step 13; if no, carrying out steps 11 and 12;

(Step 13) resetting said switching time period to zero;

(Step 14) applying a negative voltage to each said electrodes which is positioned in said vertical array and is numbered with an odd number, and applying a positive voltage to each said electrodes which is positioned in said vertical array and is numbered with an even number; and (Step 15) determining if said switching time period is reached, if yes, proceeding to the step 4; if no, carrying out steps 13 and 14.

7. A system of remediation of contaminated soil, as recited in claim 1, which is configured to perform a control process which comprises the steps of:

(Step 1) presetting a plurality of parameters; and waiting for presetting said plurality of parameters if said plurality of parameters are not set, wherein said plurality of parameters includes a switching time period for said horizontal and said vertical arrays, a pulse connecting time, and a pulse disconnecting time;

(Step 2) determining if a start button is pressed, if yes, indicating a status of automatically processing through a system status display and proceeding to step 3, if the start button is not pressed; if no, indicating a status of standby through the system status display and waiting for the start button being pressed;

(Step 3) determining if a stop button is pressed, if yes, indicating the status of standby and carrying out previous step 2; if no, proceeding next step 4;

(Step 4) resetting said switching time period to zero;

(Step 5) determining if said pulse connecting time period is reached, then applying a positive voltage to each said electrodes which is positioned in said horizontal array and is numbered with an odd number and applying a negative voltage to each said electrodes which is positioned in said horizontal array and is numbered with an even number if said pulse connecting time period is not reached, and then proceeding next step 6 if said pulse connecting time period is reached;

(Step 6) resetting said pulse connecting time period to zero;

(Step 7) determining if said pulse disconnecting time period is reached, then stopping to apply a voltage to each said electrodes which is positioned in said horizontal array and is numbered with an odd number or an even number if said pulse disconnecting time period is not reached, and then proceeding next step 8 if said pulse disconnecting time period is reached;

(Step 8) resetting said pulse connecting time period to zero;

(Step 9) determining if said switching time period is reached, if yes, proceeding next step 10, if no, returning to step 5;

(Step 10) resetting said switching time period to zero;

(Step 11) determining if said pulse connecting time period is reached, then applying a positive voltage to each said electrodes which is positioned in said vertical array and is numbered with an odd number and applying a negative voltage to each said electrodes which is positioned in said vertical array and is numbered with an even number if said pulse connecting time period is not reached, and then proceeding next step 12 if said pulse connecting time period is reached;

(Step 12) resetting said pulse disconnecting time period to zero;

(Step 13) determining if said pulse disconnecting time period is reached, then stopping to apply a voltage to each said electrodes which is positioned in said vertical array and is numbered with an odd number or an even number if said pulse disconnecting time period is not reached, and then proceeding next step 14 if said pulse disconnecting time period is reached;

(Step 14) resetting said pulse connecting time period to zero;

(Step 15) determining if said switching time period is reached, if yes, proceeding next step 16, if no, returning to step 11;

(Step 16) resetting said switching time period to zero;

(Step 17) determining if said pulse connecting time period is reached, then applying a negative voltage to each said electrodes which is positioned in said horizontal array and is numbered with an odd number and applying a positive voltage to each said electrodes which is positioned in said horizontal array and is numbered with an even number if said pulse connecting time period is not reached, and then proceeding next step 18 if said pulse connecting time period is reached;

(Step 18) resetting said pulse disconnecting time period to zero;

(Step 19) determining if said pulse disconnecting time period is reached, then stopping to apply a voltage to each said electrodes which is positioned in said horizontal array and is numbered with an odd number or an even number if said pulse disconnecting time period is not reached, and then proceeding next step 20 if said pulse disconnecting time period is reached;

(Step 20) resetting said pulse connecting time period to zero;

(Step 21) determining if said switching time period is reached, if yes, proceeding next step 22, if no, returning to step 17;

(Step 22) resetting said switching time period to zero;

(Step 23) determining if said pulse connecting time period is reached, then applying a negative voltage to each said electrodes which is positioned in said vertical array and is numbered with an odd number and applying a positive voltage to each said electrodes which is positioned in said vertical array and is numbered with an even number if said pulse connecting time period is not reached, and then proceeding next step 24 if said pulse connecting time period is reached;

(Step 24) resetting said pulse disconnecting time period to zero;

(Step 25) determining if said pulse disconnecting time period is reached, then stopping to apply a voltage to each said electrodes which is positioned in said vertical array and is numbered with an odd number or an even number if said pulse disconnecting time period is not reached, and then proceeding next step 26 if said pulse disconnecting time period is reached;

(Step 26) resetting said pulse connecting time period to zero; and (Step 27) determining if said switching time period is reached, if yes, proceeding to step 3, if no, returning to step 23.

* * * * *